(12) United States Patent
Mital et al.

(10) Patent No.: US 9,447,717 B2
(45) Date of Patent: Sep. 20, 2016

(54) MIXER FOR SHORT MIXING LENGTHS

(71) Applicant: GM GLOBAL TECHNOLOGY OPERATIONS LLC, Detroit, MI (US)

(72) Inventors: Rahul Mital, Rochester Hills, MI (US); Anil Yadav, Bangalore (IN); Jianwen Li, West Bloomfield, MI (US); Amit Prabhakar, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 44 days.

(21) Appl. No.: 14/540,056

(22) Filed: Nov. 13, 2014

(65) Prior Publication Data

US 2016/0053660 A1 Feb. 25, 2016

(30) Foreign Application Priority Data

Aug. 21, 2014 (IN) .............................. 864/KOL/2014

(51) Int. Cl.
*F01N 3/00* (2006.01)
*F01N 1/00* (2006.01)
*F01N 3/10* (2006.01)
*F01N 3/28* (2006.01)
*F01N 3/20* (2006.01)
*F01N 3/021* (2006.01)
*F01N 13/00* (2010.01)

(52) U.S. Cl.
CPC ........... *F01N 3/2892* (2013.01); *F01N 3/2066* (2013.01); *F01N 3/021* (2013.01); *F01N 13/0097* (2014.06); *F01N 2240/20* (2013.01); *F01N 2610/02* (2013.01)

(58) Field of Classification Search
CPC ............. F01N 3/2892; F01N 2240/20; F01N 13/082; F01N 3/2066; B01F 5/0617; B01F 5/0616; B01F 5/0451; B01F 3/04049; B01F 2005/00639

USPC ................................... 60/286, 303, 324, 301
See application file for complete search history.

(56) References Cited

U.S. PATENT DOCUMENTS

| | | | | |
|---|---|---|---|---|
| 4,600,544 A | * | 7/1986 | Mix ...................... | B01F 5/0616 202/158 |
| 4,981,368 A | * | 1/1991 | Smith ................... | B01F 5/0473 366/337 |
| 2008/0267780 A1 | * | 10/2008 | Wirth ..................... | B01F 3/022 416/204 A |
| 2010/0107617 A1 | * | 5/2010 | Kaiser ................. | B01F 3/04049 60/324 |
| 2011/0174407 A1 | * | 7/2011 | Lundberg .............. | B01F 5/0618 138/37 |
| 2013/0074483 A1 | | 3/2013 | Leicht et al. | |

* cited by examiner

*Primary Examiner* — Thomas Denion
*Assistant Examiner* — Diem Tran
(74) *Attorney, Agent, or Firm* — Quinn Law Group, PLLC

(57) ABSTRACT

A mixer for an exhaust gas treatment system includes a support body that defines a mixing chamber. A plurality of first blades is arranged in a row, and is disposed along a transverse axis. Each of the first blades extends from an upstream edge, toward a first lateral edge surface of the mixing chamber, to a downstream edge, at a first row angle relative to the transverse axis. A plurality of second blades is arranged in a row, and is disposed along the transverse axis. Each of the second blades extends from an upstream edge, toward a second lateral edge surface of the mixing chamber, to a downstream edge, at a second row angle relative to the transverse axis. The first row angle is less than the second row angle. The row of the first blades is axially spaced from the row of the second blades.

18 Claims, 3 Drawing Sheets

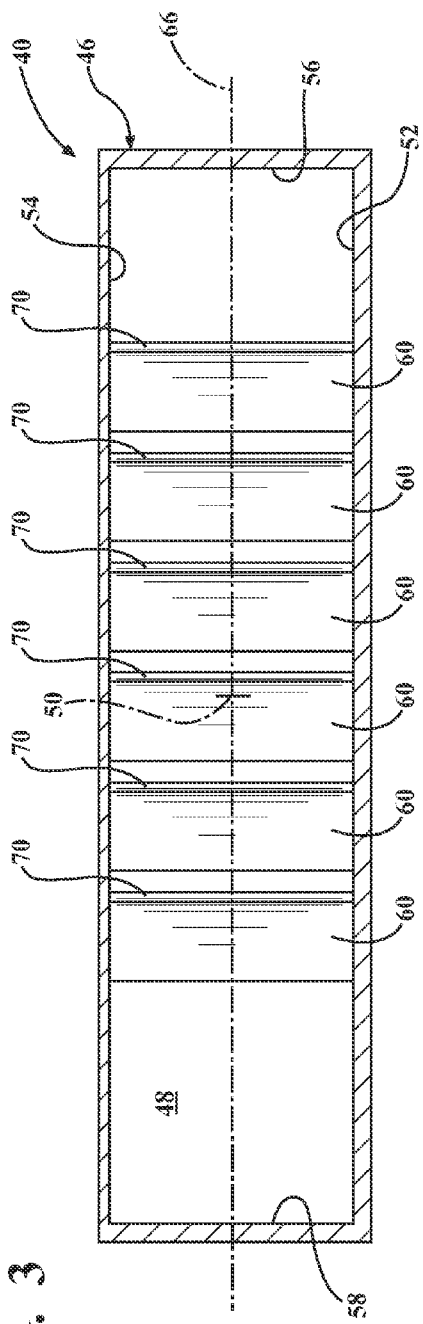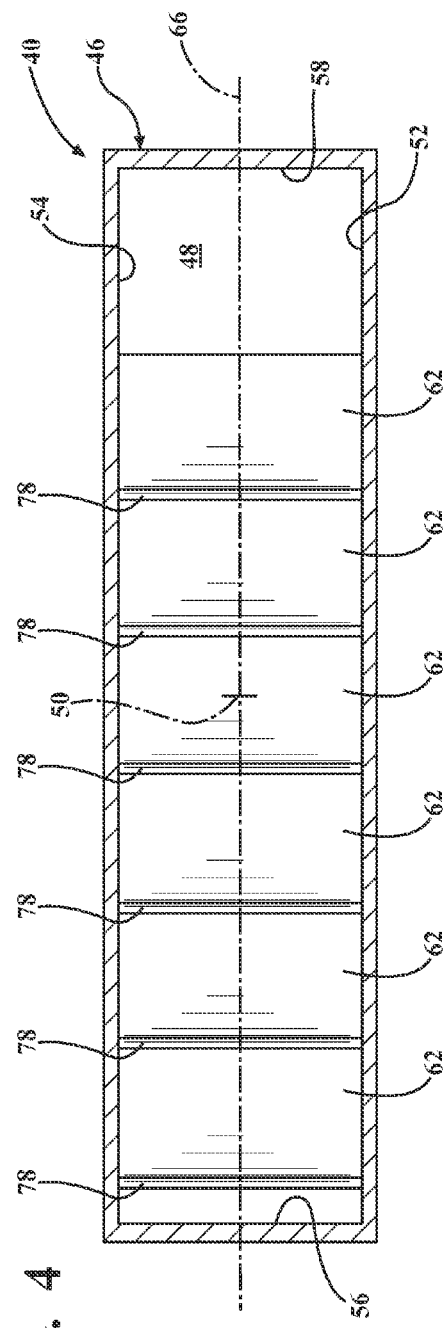

MIXER FOR SHORT MIXING LENGTHS

CROSS-REFERENCE TO RELATED APPLICATIONS

This application claims the benefit and filing date of India Provisional Patent Application No. 864/KOL/2014, filed on Aug. 21, 2014, the disclosure of which is hereby incorporated by reference.

TECHNICAL FIELD

The disclosure generally relates to a mixer for mixing a reductant into a flow of exhaust gas in an exhaust gas treatment system of a vehicle.

BACKGROUND

Exhaust gas treatment systems, particularly for vehicles having a diesel engine, may include a Selective Catalytic Reduction (SCR) catalytic converter. The SCR catalytic converter reacts with a reductant, which is introduced into a flow of exhaust gas, by an injector disposed upstream of the SCR catalytic converter. The reductant reacts with the nitric oxides in the exhaust gas over a catalyst in the SCR catalytic converter to convert the nitric oxides in the exhaust gas into nitrogen and water. The reductant may include a mixture of urea and water. The exhaust gas treatment system includes a mixer, which is disposed downstream of the reductant injector, and upstream of the SCR catalytic converter. The mixer mixes and/or vaporizes the reductant into the flow of exhaust gas.

SUMMARY

A mixer for an exhaust gas treatment system of a vehicle is provided. The mixer includes a support body that defines a substantially rectangular mixing chamber. The mixing chamber defines a fluid flow path that is disposed along a longitudinal axis of the mixer. The mixing chamber includes a lower surface, an upper surface spaced from and opposing the lower surface, a first lateral edge surface extending between the lower surface and the upper surface, and a second lateral edge surface extending between the lower surface and the upper surface and opposing the first lateral edge surface. A plurality of first blades is arranged in a single row, and extends between the lower surface and the upper surface of the mixing chamber. The single row of the first blades is disposed along a transverse axis. The transverse axis is substantially perpendicular to the longitudinal axis. Each of the first blades extends along the longitudinal axis, from an upstream edge, toward the first lateral edge surface of the mixing chamber, to a downstream edge, at a first row angle relative to the transverse axis. A plurality of second blades is arranged in a single row, and extend between the lower surface and the upper surface of the mixing chamber. The single row of the second blades is disposed along the transverse axis. Each of the second blades extends along the longitudinal axis, from an upstream edge, toward the second lateral edge surface of the mixing chamber, to a downstream edge, at a second row angle relative to the transverse axis. The first row angle is different from the second row angle. The single row of the first blades is axially spaced along the longitudinal axis a row spacing distance from the single row of the second blades.

An exhaust gas treatment system for treating a flow of exhaust gas from an engine of a vehicle is also provided. The exhaust gas treatment system includes a flow structure defining a fluid flow path for the flow of exhaust gas. A Selective Catalytic Reduction (SCR) catalytic converter is in fluid communication with the fluid flow path for receiving the flow of exhaust gas. An injector is in fluid communication with the fluid flow path, upstream of the SCR catalytic converter. The injector is operable to inject a reductant into the flow of exhaust gas. A mixer is disposed downstream of the injector and upstream of the SCR catalytic converter. The mixer is operable to mix the reductant with the flow of exhaust gas. The mixer includes a support body that defines a substantially rectangular mixing chamber in the fluid flow path. The mixing chamber is disposed along a longitudinal axis of the mixer. The mixing chamber includes a lower surface, an upper surface spaced from and opposing the lower surface, a first lateral edge surface extending between the lower surface and the upper surface, and a second lateral edge surface extending between the lower surface and the upper surface and opposing the first lateral edge surface. A plurality of first blades is arranged in a single row, and extends between the lower surface and the upper surface of the mixing chamber. The single row of the first blades is disposed along a transverse axis. The transverse axis is substantially perpendicular to the longitudinal axis. Each of the first blades extends along the longitudinal axis, from an upstream edge, toward the first lateral edge surface of the mixing chamber, to a downstream edge, at a first row angle relative to the transverse axis. A plurality of second blades is arranged in a single row, and extend between the lower surface and the upper surface of the mixing chamber. The single row of the second blades is disposed along the transverse axis. Each of the second blades extends along the longitudinal axis, from an upstream edge, toward the second lateral edge surface of the mixing chamber, to a downstream edge, at a second row angle relative to the transverse axis. The first row angle is less than the second row angle. The single row of the first blades is axially spaced along the longitudinal axis a row spacing distance from the single row of the second blades.

Accordingly, the single row of the first blades and the single row of the second blades vaporize the reductant and mix the reductant into the flow of exhaust gas, as well as create a swirling flow downstream of the row of second blades. The mixer provides a short mixing length along the longitudinal axis with a low pressure drop, and is inexpensive to manufacture. The mixer achieves a high reductant evaporation rate into the flow of exhaust gas, which reduces deposits and provides a high Nitric Oxide (NOx) conversion rate.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 3 is a schematic cross sectional upstream view of the mixer, viewed from a plane disposed on the transverse axis and perpendicular to the longitudinal axis.

FIG. 4 is a schematic cross sectional downstream view of the mixer, viewed from a plane disposed on the transverse axis and perpendicular to the longitudinal axis.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
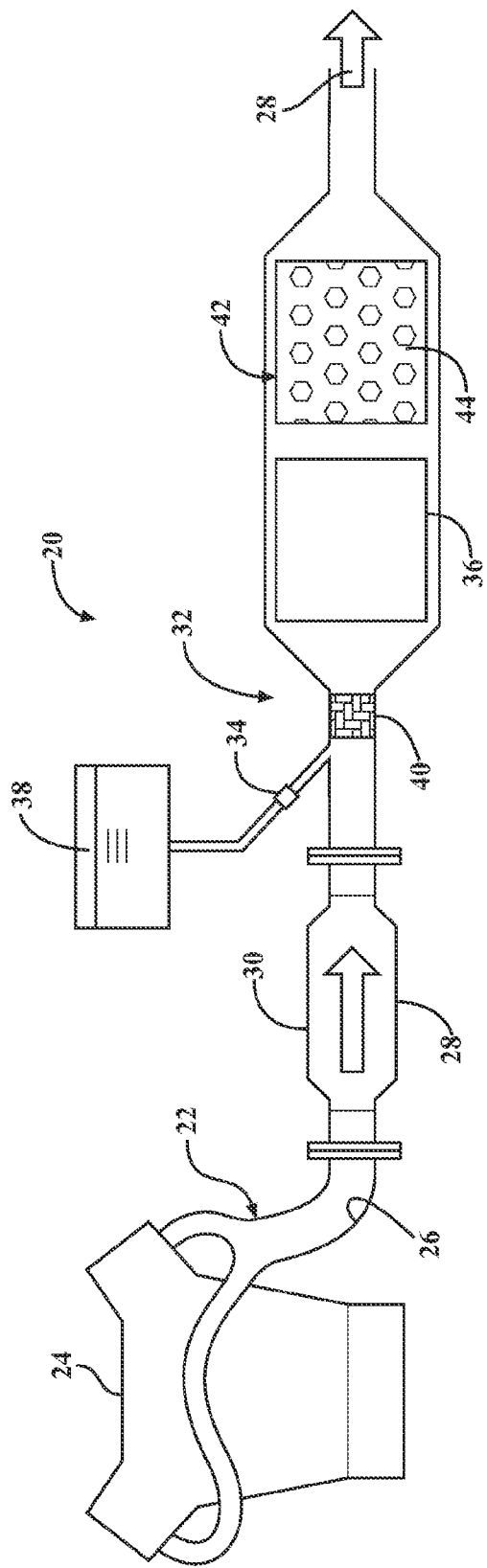
FIG. 1 is a schematic plan view of an engine and an exhaust gas treatment system of a vehicle.

Referring to FIG. 1, wherein like numerals indicate like parts throughout the several views, an exhaust gas treatment system is generally shown at 20. The exhaust gas treatment system 20 includes a flow structure 22 that is coupled to an engine 24 of a vehicle. The engine 24 may include, but is not limited to, a diesel engine 24. Fuel ignites within a plurality of cylinders (not shown) of the engine 24, producing a flow of exhaust gas. The flow structure 22 receives the flow of exhaust gas, and defines a fluid flow path 26 for the flow of exhaust gas. The flow of exhaust gas is directed through the flow structure 22 of the exhaust gas treatment system 20 in a direction indicated by arrow 28. The exhaust gas treatment system 20 treats the exhaust gas to reduce undesirable emissions, and remove particulate matter, i.e., soot, from the exhaust gas.

The exhaust gas treatment system 20 may include an oxidation catalyst 30 disposed in fluid communication with the fluid flow path 26 for receiving the flow of the exhaust gas. The oxidation catalyst 30 includes a flow-through honeycomb structure that is covered with a chemical catalyst. The chemical catalyst may include a precious metal, including but not limited to, platinum or palladium. The chemical catalyst, when heated to a light-off temperature, interacts with and oxidizes reactants in the exhaust gas, such as carbon monoxide and unburned hydrocarbons, thereby reducing undesirable emissions. The oxidation catalyst 30 may include any suitable type of oxidation catalyst 30, and may be sized and or configured in any suitable manner required to meet specific design parameters.

The exhaust gas treatment system 20 may further include a Selective Catalytic Reduction (SCR) system 32. The SCR system 32 is disposed in fluid communication with the fluid flow path 26 for receiving the flow of exhaust gas. The SCR system 32 is disposed downstream of the oxidation catalyst 30. The SCR system 32 includes an injector 34 and a SCR catalytic converter 36. The injector 34 is disposed in fluid communication with the fluid flow path 26 upstream of the SCR catalytic converter 36, and is operable to inject a reductant 38 into the flow of exhaust gas. The reductant 38, may include, but is not limited to a mixture of urea and water. The reductant 38 is often referred to as Diesel Emission Fluid (DEF).

The SCR system 32 further includes a mixer 40. The mixer 40 is disposed downstream of the injector 34, and upstream of the SCR catalytic converter 36. The mixer 40 is operable to mix and/or evaporate the reductant 38 into the flow of exhaust gas. When heated by the exhaust gas, the reductant 38 forms ammonia. The SCR catalytic converter 36 includes a chemical catalyst that causes or accelerates a chemical reaction between the ammonia created by the reductant 38 and the NOx (nitrogen oxides) in the exhaust gas to form nitrogen and water vapor.

The exhaust gas treatment system 20 may further include a particulate filter 42. The particulate filter 42 filters particulate matter, i.e., soot, from the exhaust gas of the engine 24. The particulate filter 42 may include one or more substrates 44 that define a plurality of apertures, through which the exhaust gas must flow. The particulate matter collects on the substrates 44 as the exhaust gas flows through the apertures. The particulate filter 42 is occasionally regenerated to remove the collected particulate matter. Regeneration of the particulate filter 42 includes heating the particulate filter 42 to a temperature sufficient to burn the collected particulate matter to carbon dioxide.

Figure 2:
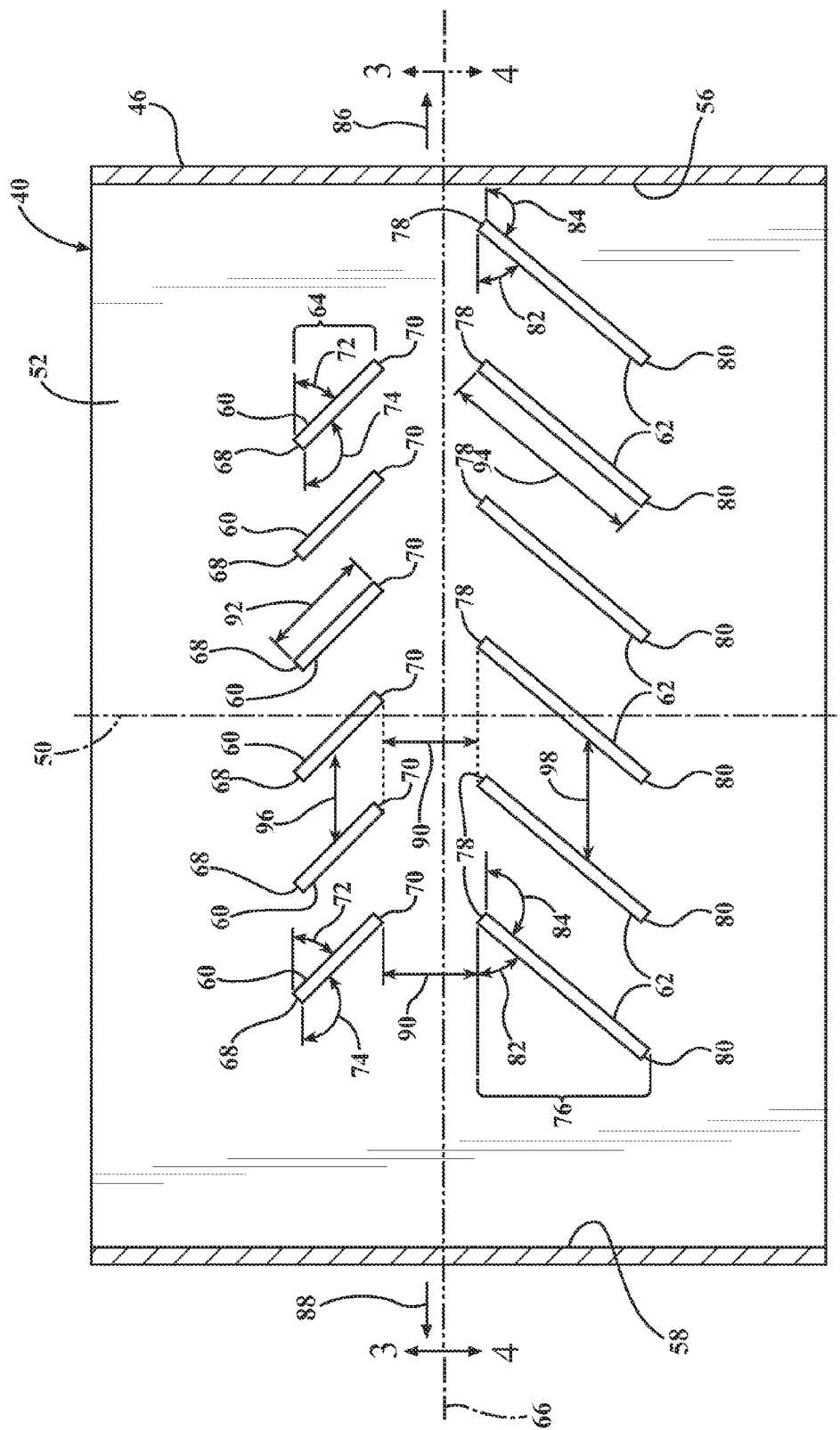
FIG. 2 is a schematic cross sectional view of a mixer of the exhaust gas treatment system, as viewed along a plane parallel with a longitudinal axis and transverse axis of the mixer.

Referring to FIGS. 2 through 4, the mixer 40 includes a support body 46. The support body 46 may be directly defined by the flow structure 22 of the exhaust gas treatment system 20, or may be a separate manufacture that is disposed within and/or otherwise attached to the flow structure 22. The support body 46 defines a mixing chamber 48. The mixing chamber 48 is disposed in and/or forms part of the fluid flow path 26 for the flow of exhaust gas. The mixing chamber 48 extends along a longitudinal axis 50, which is generally parallel with the fluid flow path 26 through the mixing chamber 48. As best shown in FIGS. 3 and 4, the mixing chamber 48 includes a cross section perpendicular to the longitudinal axis 50 that is substantially rectangular in shape, in which a width of the cross section of the mixing chamber 48 is generally larger than a height of the cross section of the mixing chamber 48. The mixing chamber 48 includes a lower surface 52 and an upper surface 54 spaced from and opposing the lower surface 52. The mixing chamber 48 further includes a first lateral edge surface 56 that extends between the lower surface 52 and the upper surface 54, and a second lateral edge surface 58 that extends between the lower surface 52 and the upper surface 54. The second lateral edge surface 58 opposes the first lateral edge surface 56.

Referring to FIG. 2, the mixer 40 includes a plurality of first blades 60 and a plurality of second blades 62. The plurality of first blades 60 is arranged in a single row 64. Each of the first blades 60 extend between the lower surface 52 and the upper surface 54 of the mixing chamber 48. The single row 64 of the first blades 60 is disposed or extends along a transverse axis 66. The transverse axis 66 is substantially perpendicular to the longitudinal axis 50, such that the transverse axis 66 and the longitudinal axis 50 form a plane substantially parallel with either the upper surface 54 and/or the lower surface 52 of the mixing chamber 48.

Each of the first blades 60 extends along the longitudinal axis 50, from an upstream edge 68, toward the first lateral edge surface 56 of the mixing chamber 48. Each of the first blades 60 extends from the upstream edge 68 to a downstream edge 70 at a first row angle 72 relative to the transverse axis 66. Each of the plurality of first blades 60 is arranged such that a line extending from the upstream edge 68 to the downstream edge 70 of each respective first blade 60 forms an open side angle 74 relative to the transverse axis 66, and also forms the first row angle 72 relative to the transverse axis 66. The open side angle 74 and the first row angle 72 of each respective first blade 60 are supplementary angles, i.e., angles that add up to 180°. The open side angle 74 of each of the first blades 60 is an obtuse angle, and the first row angle 72 of each of the first blades 60 is an acute angle.

As best shown in FIG. 2, the plurality of second blades 62 is arranged in a single row 76. Each of the plurality of second blades 62 extend between the lower surface 52 and the upper surface 54 of the mixing chamber 48. The single row 76 of the second blades 62 extends and/or is disposed along the transverse axis 66.

Each of the second blades 62 extends along the longitudinal axis 50, from an upstream edge 78, toward the second lateral edge surface 58 of the mixing chamber 48. Each of the second blades 62 extends from the upstream edge 78 to a downstream edge 80, at a second row angle 82 relative to the transverse axis 66. Each of the plurality of second blades 62 is arranged such that a line extending from the upstream edge 78 to the downstream edge 80 of each respective second blade 62 forms an open side angle 84 relative to the transverse axis 66, and also forms the second row angle 82 relative to the transverse axis 66. The open side angle 84 and the second row angle 82 of each respective second blade 62 are supplementary angles, i.e., angles that add up to 180°. The open side angle 84 of each of the second blades 62 is an obtuse angle, and the second row angle 82 of each of the second blades 62 is an acute angle.

As shown in FIG. 2, the first row angle 72 between the transverse axis 66 and each respective first blade 60 opens in a first axial direction 86 along the transverse axis 66. The second row angle 82 between the transverse axis 66 and each respective second blade 62 opens in a second axial direction 88 along the transverse axis 66. The first axial direction 86 is opposite the second axial direction 88. Accordingly, as viewed on the page of FIG. 2, the first blades 60 angle downstream and to the right or toward the first lateral edge surface 56, and the second blades 62 angle downstream and to the left or toward the second lateral edge surface 58.

The first row angle 72 includes or defines a value that is different from the value of the second row angle 82. More specifically, the first row angle 72 is less than the second row angle 82. Preferably, the first row angle 72 is between 35° and 60°, and the second row angle 82 is between 35° and 60°. More preferably, the first row angle 72 is equal to 45°, and the second row angle 82 is equal to 50°.

As shown in FIG. 2, the single row 64 of the first blades 60 is axially spaced a row spacing distance 90 along the longitudinal axis 50 from the single row 76 of the second blades 62. Accordingly, the downstream edge 70 of the first blades 60 are axially spaced along the longitudinal axis 50 from the upstream edge 78 of the second blades 62. Preferably, the row spacing distance 90 is greater than 5 mm. More preferably, the row spacing distance 90 is approximately equal to 10 mm.

As shown in FIG. 2, each of the plurality of first blades 60 include a first blade length 92, which is measured between the upstream edge 68 and the downstream edge 70 of each respective first blade 60. Each of the plurality of second blades 62 include a second blade length 94, which is measured between the upstream edge 78 and the downstream edge 80 of each respective second blade 62. The first blade length 92 is different from the second blade length 94. More specifically, the first blade length 92 is less than the second blade length 94. Preferably, the first blade length 92 is between 5 mm and 15 mm, and the second blade length 94 is between 20 mm and 30 mm. More preferably, the first blade length 92 is equal to 12 mm, and the second blade length 94 is equal to 24 mm.

As shown in FIG. 2, each adjacent pair of the plurality of first blades 60 are spaced a first gap distance 96 from each other along the transverse axis 66. Each adjacent pair of the plurality of second blades 62 are spaced a second gap distance 98 from each other along the transverse axis 66. The first gap distance 96 is different from the second gap distance 98. More specifically, the first gap distance 96 is less than the second gap distance 98. Preferably, the first gap distance 96 is between 5 mm and 15 mm, and the second gap distance 98 is between 10 mm and 20 mm. More preferably, the first gap distance 96 is equal to 12 mm, and the second gap distance 98 is equal to 14 mm.

Because the first gap distance 96 is different from the second gap distance 98, each of the first blades 60 cannot be aligned with one of the second blades 62 along the transverse axis 66. However, the downstream edge 70 of at least one of the plurality of first blades 60 is substantially aligned along the transverse axis 66 with the upstream edge 78 of at least one of the plurality of second blades 62. Accordingly, the downstream edge 70 of at least one of the first blades 60 and the upstream edge 78 of at least one of the second blades 62 are spaced an approximately equal distance from the longitudinal axis 50. As best shown in FIG. 2, the leftmost first blade 60 and the leftmost second blade 62 as viewed on the page of FIG. 2 are substantially aligned with each other along the transverse axis 66.

As best shown in FIG. 2, the row 64 of first blades 60 and the row 76 of second blades 62 are not centered between the first lateral edge surface 56 and the second lateral edge surface 58 of the mixing chamber 48. Rather, the row 64 of first blades 60 and the row 76 of second blades 62 are laterally offset toward i.e., nearer one of the first lateral edge surface 56 or the second lateral edge surface 58 of the mixing chamber 48. As shown, the row 64 of first blades 60 and the row 76 of second blades 62 are offset nearer the first lateral edge surface 56. This provides a larger path between leftmost first blade 60 and the leftmost second blade 62 as viewed on the page of FIG. 2 relative to the second lateral edge surface 58, than the path between the rightmost first blade 60 and the rightmost second blade 62 as viewed on the page of FIG. 2 relative to the first lateral edge surface 56. This offset configuration of the row 64 of first blades 60 and the row 76 of second blades 62 helps induce a swirling flow disposed downstream of the row 76 of second blades 62.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A mixer for an exhaust gas treatment system of a vehicle, the mixer comprising:
   a support body defining a substantially rectangular mixing chamber with a fluid flow path disposed along a longitudinal axis, wherein the mixing chamber includes a lower surface, an upper surface spaced from and opposing the lower surface, a first lateral edge surface extending between the lower surface and the upper surface, and a second lateral edge surface extending between the lower surface and the upper surface and opposing the first lateral edge surface;
   a plurality of first blades arranged in a single row and extending between the lower surface and the upper surface of the mixing chamber, with the single row of the first blades disposed along a transverse axis that is substantially perpendicular to the longitudinal axis;
   wherein each of the first blades extends along the longitudinal axis, from an upstream edge, toward the first lateral edge surface of the mixing chamber, to a downstream edge, at a first row angle relative to the transverse axis;

a plurality of second blades arranged in a single row and extending between the lower surface and the upper surface of the mixing chamber, with the single row of the second blades disposed along the transverse axis;

wherein each of the second blades extends along the longitudinal axis, from an upstream edge, toward the second lateral edge surface of the mixing chamber, to a downstream edge, at a second row angle relative to the transverse axis;

wherein the single row of the first blades is axially spaced along the longitudinal axis from the single row of the second blades a row spacing distance;

wherein the first row angle is different from the second row angle; and wherein each adjacent pair of the plurality of first blades are spaced a first gap distance from each other along the transverse axis, and each adjacent pair of the plurality of second blades are spaced a second gap distance from each other along the transverse axis, wherein the first gap distance is less than the second gap distance.

2. The mixer set forth in claim 1 wherein the row spacing distance is greater than 5 mm.

3. The mixer set forth in claim 1 wherein the first row angle is less than the second row angle.

4. The mixer set forth in claim 1 wherein the downstream edge of one of the plurality of first blades is substantially aligned along the transverse axis with the upstream edge of one of the plurality of second blades, an approximately equal distance from the longitudinal axis.

5. The mixer set forth in claim 1 wherein each of the plurality of first blades is arranged such that a line extending from the upstream edge to the downstream edge of each respective first blade forms an open side angle relative to the transverse axis and the first row angle relative to the transverse axis, wherein the open side angle and the first row angle are supplementary angles, the open side angle is an obtuse angle, and the first row angle is an acute angle.

6. The mixer set forth in claim 5 wherein each of the plurality of second blades is arranged such that a line extending from the upstream edge to the downstream edge of each respective second blade forms an open side angle relative to the transverse axis and the second row angle relative to the transverse axis, wherein the open side angle and the second row angle are supplementary angles, the open side angle is an obtuse angle, and the second row angle is an acute angle.

7. The mixer set forth in claim 5 wherein the first row angle between the transverse axis and each respective first blade opens in a first axial direction along the transverse axis, the second row angle between the transverse axis and each respective second blade opens in a second axial direction along the transverse axis, with the first axial direction opposite the second axial direction.

8. The mixer set forth in claim 1 wherein the first row angle is between 35° and 60°, and the second row angle is between 35° and 60°.

9. The mixer set forth in claim 8 wherein the first row angle is equal to 45°, and the second row angle is equal to 50°.

10. The mixer set forth in claim 1 wherein each of the plurality of first blades include a first blade length measured between the upstream edge and the downstream edge of each respective first blade, and each of the plurality of second blades include a second blade length measured between the upstream edge and the downstream edge of each respective second blade, wherein the first blade length is less than the second blade length.

11. The mixer set forth in claim 10 wherein the first blade length is between 5 mm and 15 mm, and the second blade length is between 20 mm and 30 mm.

12. The mixer set forth in claim 11 wherein the first blade length is equal to 12 mm, and the second blade length is equal to 24 mm.

13. The mixer set forth in claim 1 wherein the first gap distance is between 5 mm and 15 mm, and the second gap distance is between 10 mm and 20 mm.

14. The mixer set forth in claim 13 wherein the first gap distance is equal to 12 mm, and the second gap distance is equal to 14 mm.

15. An exhaust gas treatment system for treating a flow of exhaust gas from an engine of a vehicle, the exhaust gas treatment system comprising:

a flow structure defining a fluid flow path for the flow of exhaust gas;

a Selective Catalytic Reduction (SCR) catalytic converter in fluid communication with the fluid flow path for receiving the flow of exhaust gas;

an injector in fluid communication with the fluid flow path upstream of the SCR catalytic converter, and operable to inject a reductant into the flow of exhaust gas;

a mixer disposed downstream of the injector and upstream of the SCR catalytic converter, and operable to mix the reductant with the flow of exhaust gas, wherein the mixer includes:

a support body defining a substantially rectangular mixing chamber in the fluid flow path, and disposed along a longitudinal axis, wherein the mixing chamber includes a lower surface, an upper surface spaced from and opposing the lower surface, a first lateral edge surface extending between the lower surface and the upper surface, and a second lateral edge surface extending between the lower surface and the upper surface and opposing the first lateral edge surface;

a plurality of first blades arranged in a single row and extending between the lower surface and the upper surface of the mixing chamber, with the single row of the first blades disposed along a transverse axis that is substantially perpendicular to the longitudinal axis;

wherein each of the first blades extends along the longitudinal axis, from an upstream edge, toward the first lateral edge surface of the mixing chamber, to a downstream edge, at a first row angle relative to the transverse axis;

a plurality of second blades arranged in a single row and extending between the lower surface and the upper surface of the mixing chamber, with the single row of the second blades disposed along the transverse axis;

wherein each of the second blades extends along the longitudinal axis, from an upstream edge, toward the second lateral edge surface of the mixing chamber, to a downstream edge, at a second row angle relative to the transverse axis;

wherein the single row of the first blades is axially spaced along the longitudinal axis from the single row of the second blades a row spacing distance; and wherein the first row angle is less than the second row angle; and wherein each adjacent pair of the plurality of first blades are spaced a first gap distance from each other along the transverse axis, and each adjacent pair of the plurality of second blades are spaced a second gap distance from each other along the transverse axis, wherein the first gap distance is less than the second gap distance.

16. The exhaust gas treatment system set forth in claim 15 wherein each of the plurality of first blades include a first blade length measured between the upstream edge and the downstream edge of each respective first blade, and each of the plurality of second blades include a second blade length measured between the upstream edge and the downstream edge of each respective second blade, wherein the first blade length is less than the second blade length.

17. The exhaust gas treatment system set forth in claim 16 wherein:
   the row spacing distance is greater than 5 mm;
   the first row angle is equal to 45°;
   the second row angle is equal to 50°;
   the first blade length is equal to 12 mm;
   the second blade length is equal to 24 mm;
   the first gap distance is equal to 12 mm; and
   the second gap distance is equal to 14 mm.

18. The exhaust gas treatment system set forth in claim 16 wherein the downstream edge of one of the plurality of first blades is substantially aligned along the transverse axis with the upstream edge of one of the plurality of second blades, an approximately equal distance from the longitudinal axis.

* * * * *